Oct. 31, 1933.                L. E. LA BRIE                1,932,900
                                  BRAKE
                          Filed Feb. 4, 1929

INVENTOR.
Ludger E. LaBrie
BY H. O. Clayton
ATTORNEY

Patented Oct. 31, 1933

1,932,900

UNITED STATES PATENT OFFICE 1,932,900

BRAKE

Ludger E. La Brie, South Bend, Ind., assignor to Bendix Brake Company, South Bend, Ind., a corporation of Illinois Application February 4, 1929. Serial No. 337,229

10 Claims. (Cl. 188—78)

This invention relates to brakes and is illustrated as embodied in an internal expanding brake for an automotive vehicle.

An object of the invention is to provide a novel operating means for the brake so arranged with respect to the co-operating parts of the brake as to insure the anchoring of one end thereof during the applying stage to thus obviate the otherwise objectionable anchoring click which would ensue, should the brake leave the anchor. To this end the vertical tensioning link of a toggle operating mechanism is inclined with respect to the usual horizontally extending brake return spring and the inclined thrust links of the toggle are preferably made of unequal length.

A further feature of the invention relates to so positioning the crank and link of an operating mechanism with respect to the ends of the friction means as to make possible the employment of the bearing of the crank shaft as an anchoring abutment for both ends of the said friction means. A compact and rigid anchor structure is thus presented. This I accomplish in one embodiment of my invention by offsetting the central link of a toggle from the vertical, as previously described, and pivoting one end of one of the thrust links to one end of the friction device at a point which is closer to the anchor than the corresponding point at the end of the other thrust link. The thrust links are thus made of unequal length to accomplish the purpose desired.

Other features of my invention, including various novel combinations of parts and desirable particular constructions will be apparent from the following description of the illustrative embodiment shown in the accompanying drawing, in which.

Figure 1:
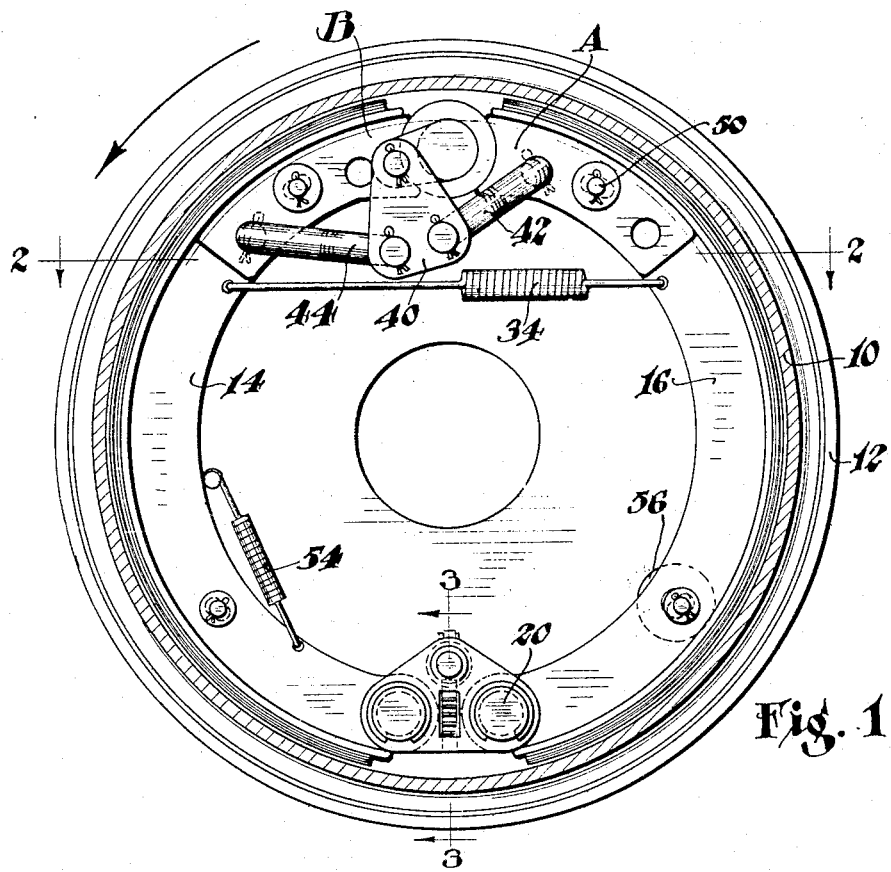
Figure 1 is a vertical section through the brake taken just inside the head of the brake drum showing the friction device and the novel operating means in side elevation.
Figure 2:
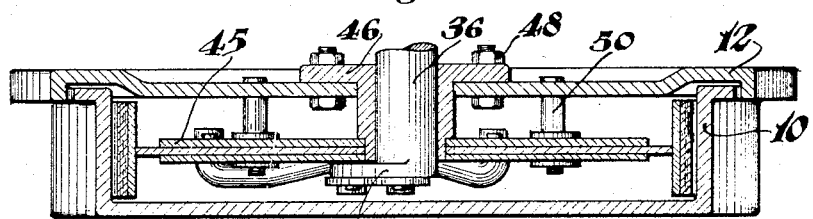
Figure 2 is a partial section taken on the line 2—2 of Figure 1 disclosing in more detail my novel applying mechanism.
Figure 3:
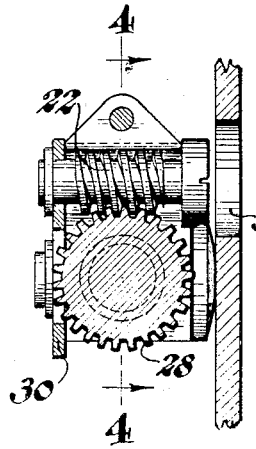
Figure 3 is a section on the line 3—3 of Figure 1 indicating a novel floating adjusting means connecting the two shoes of the friction device.
Figure 4:
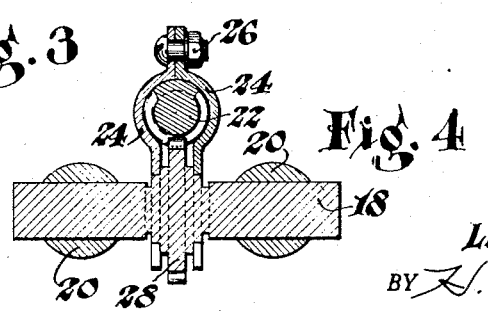
Figure 4 is a section taken on the line 4—4 of Figure 3 disclosing the worm and gear adjustment in more detail.

In the illustrated embodiment I have disclosed a rotatable drum 10 at the open side of which is a support such as a backing plate 12, and within which is the friction means of the brake. As disclosed, the friction means includes two interchangeable T-sectioned stamped steel brake shoes 14 and 16 suitably lined on their friction faces with the conventional brake lining.

The lower ends of the shoes are pivotally connected by a novel floating adjustable joint, preferably including a right and left threaded adjusting member 18 meshing at its ends with transverse pivot pins 20 journaled in the ends of the shoes. The adjustment of the screw to separate the shoes may be effected by a worm 22 supported by vertically arranged stampings 24 secured together by a fastening 26. Worm 22 meshes with a gear 28 positioned in the center and preferably integral with the screw 18, all parts being confined laterally by the heads of the pins 20 contacting the backing plate and by a plate 30 covering the parts and sloted to accommodate the gear. Adjustment may be effected by a screw driver inserted through a slot 32 in the backing plate into the notched head of the worm.

According to an important feature of my invention, I provide a novel arrangement of a crank and link operating mechanism so positioned with respect to the ends of the friction device as to permit the anchoring of the latter at either end on a common anchor post, which post also functions as a bearing for the crank shaft.

In the embodiment illustrated the brake is applied, against the resistance of a return spring 34, by means such as an operating shaft 36 having a crank arm 38 provided with a pivoted tension link 40 at its end, the link being shown as generally triangular in form. Link 40 is pivotally connected to a pair of thrust links 42 and 44, the latter being longer than the former and each link is pivotally mounted at its upper end on one end of each brake shoe passing through reinforcing plates 45 thereof. The end of each shoe is formed with a rounded recess adapted to engage the reduced rounded end of the shaft bearing block 46 securely fixed as by bolts 48 to the backing plate. Steady rests 50 contact the reinforcing plates 45 at the ends of the shoes and a supplemental return spring 54 and eccentric adjustable stop 56 complete the necessary brake parts.

An important feature of my invention resides in the arrangement and proportioning of the several operating parts to effect the aforementioned results. The tension link 40 is preferably inclined to the vertical and arranged in front of the webs of the shoes, which arrangement taken with the respective length of the thrust links 42 and 44 permits both ends of the shoes to anchor on the common anchor post 46. In order to further facilitate the anchoring referred to, the thrust links 42 and 44 are inclined at different angles with respect to the horizontal, that is with respect to the line of the return spring 34.

The useful function of insuring that end A remain anchored during the application of the brake also results from the structure described, this by virtue of the fact that the horizontal component of the link 42 is less than one-half the contracting force of the return spring. By virtue of the very acute angle of link 44 with the horizontal its horizontal component is very high as compared with that of link 42 with the result that end B will leave the anchor post during the initial spread of the toggle and before the brake is fully applied. Assuming the drum to be rotating counter-clockwise as indicated by the arrow in Figure 1, which will be the direction of movement of the drum with the vehicle moving forward (a left front wheel being disclosed), the end A will remain anchored with the construction disclosed. The objectionable click of the shoe against the post that would otherwise ensue is thus obviated.

This action may also be explained by the fact that with the construction presented the horizontal component of the force acting along the tension link 40 effects a pull of the end A against the anchor post.

As disclosed, links 42 and 44 are of unequal length and the variation in horizontal components referred to may be accentuated by making this variation in length more pronounced.

While but one embodiment of my invention has been disclosed and described in detail, it is not my intention to limit the scope of the invention to that particular embodiment or otherwise than by the terms of the appended claims.

I claim:

1. A brake comprising, in combination, a drum, a plurality of articulated floating shoes within the drum arranged to anchor on one shoe when the drum is turning in one direction and to anchor on the other shoe when the drum is turning in the other direction, and a toggle having one leg longer than the other connecting the anchoring shoes.

2. A brake comprising, in combination, a drum, a support plate provided with an anchor member fixedly secured thereto, a friction device within said drum anchoring on said anchor member in either direction of drum rotation, and operating means including a shaft extending through an opening in the anchor member and further including parts connected to the friction device and to the shaft, the several operating parts being so arranged as to permit anchoring of either end of the friction device on said anchor member.

3. A brake comprising, in combination, a drum, a floating friction device within the drum having separable ends, a shaft extending between said ends and having an arm at its end, a toggle linked to said arm and connected to said ends, said toggle comprising links of unequal length.

4. A brake comprising, in combination, a drum, a floating friction device within the drum having separable ends, a shaft extending between said ends and having an arm at its end, a toggle linked to said arm and connected to said ends, said toggle comprising links of unequal length, and a hollow member enclosing the shaft and serving as a stationary anchor engaged by said ends.

5. A brake comprising a friction device having separable ends and an applying toggle arranged adjacent said ends, said toggle including links of unequal length connected to said ends and an applying link connected to said thrust links and inclined to a line passing through the geometrical center of the brake and equidistant from the separable ends thereof.

6. A brake comprising a friction element having separable ends and a toggle operating means characterized by thrust links of unequal length connecting the separable ends of the friction element.

7. A brake comprising a toggle operating means characterized by thrust links of unequal length connected to a triangular shaped applying link.

8. A brake comprising, in combination, a drum, a plurality of articulated floating shoes within the drum arranged to anchor on one shoe when the drum is turning in one direction and to anchor on the other shoe when the drum is turning in the other direction, and a toggle operating means for said shoes arranged to move one of said shoes into drum engagement and to retain the other shoe against the anchor.

9. A brake comprising a fixed support, an anchor on the support, friction means movable on the support having separable ends engaging the anchor, a shaft positioned for rotation in the anchor, an arm on the shaft, a member pivoted to the arm and links of unequal length connecting the member to the respective separable ends.

10. A brake comprising a fixed support, a drum associated therewith, an anchor on the support, friction means adaptable for co-operation with the drum movably positioned on the support and provided with separable ends adaptable for engagement with the anchor, a shaft positioned for rotation in the anchor, an arm on the shaft, a triangular member having its apex pivoted to the arm and links of unequal length connecting the base angles of the triangular member to the respective separable ends of the friction member.

LUDGER E. LA BRIE.